United States Patent
Hsieh

(10) Patent No.: US 10,124,855 B2
(45) Date of Patent: Nov. 13, 2018

(54) DISC BRAKE CALIPER OF BICYCLE

(71) Applicant: LEE CHI ENTERPRISES COMPANY LTD., Changhua (TW)

(72) Inventor: Tsung-Yu Hsieh, Caotun Township (TW)

(73) Assignee: LEE CHI ENTERPRISES COMPANY LTD., Changhua (TW)

( * ) Notice: Subject to any disclaimer, the term of this patent is extended or adjusted under 35 U.S.C. 154(b) by 0 days.

(21) Appl. No.: 15/350,940

(22) Filed: Nov. 14, 2016

(65) Prior Publication Data

US 2018/0134338 A1    May 17, 2018

(51) Int. Cl.
*B62L 3/02*    (2006.01)

(52) U.S. Cl.
CPC .................................. *B62L 3/023* (2013.01)

(58) Field of Classification Search
CPC .......... B62L 3/023; B62K 19/38; F16L 27/00; F16L 27/02
USPC .............................. 285/190, 191, 142.1, 273
See application file for complete search history.

(56) References Cited

U.S. PATENT DOCUMENTS

| | | | | |
|---|---|---|---|---|
| 3,125,360 A | * | 3/1964 | Ulrich | F16L 27/093 285/124.5 |
| 5,372,389 A | * | 12/1994 | Tam | F16L 27/093 285/147.3 |
| 2008/0238092 A1 | * | 10/2008 | Chen | B25C 1/04 285/190 |
| 2013/0200614 A1 | * | 8/2013 | Tsai | B62L 3/023 285/351 |

FOREIGN PATENT DOCUMENTS

| | | |
|---|---|---|
| TW | M434727 U | 8/2012 |
| TW | 20151861 A | 5/2015 |

* cited by examiner

*Primary Examiner* — Vishal R Sahni
(74) *Attorney, Agent, or Firm* — Lynette Wylie; Apex Juris, pllc.

(57) ABSTRACT

A disc brake caliper of a bicycle includes a main body, a first bolt, an intermediate member, a second bolt, and a tubing connector. The main body has an oil passage and a first tapped hole communicating with the oil passage. The first bolt is screwed into the first tapped hole, with a first exposed section exposed out of the main body. The intermediate member fits around the first exposed section through a first perforation, and has a second tapped hole, which extends in a direction different from that of the first perforation. The intermediate member can be rotated relative to the first exposed section. The second bolt is screwed in the second tapped hole, with a second exposed section exposed out of the intermediate member. The tubing connector fits around the second exposed section through a second perforation, and can be rotated relative to the second exposed section.

5 Claims, 5 Drawing Sheets

DISC BRAKE CALIPER OF BICYCLE

BACKGROUND OF THE INVENTION

1. Technical Field

The present invention relates to a disc brake system of a bicycle, and more particularly to a disc brake caliper, wherein a tubing of the disc brake caliper could be adjusted in multiple directions.

2. Description of Related Art

Various braking mechanisms have been developed in the bicycle industry, and among those braking mechanisms, disc brakes are widely used in off-road and even road bikes. While using a disc brake system, a brake lever is pulled to inject brake oil into an oil passage inside a brake caliper, which drives a piston on the brake caliper to move brake pads, clamping a disc brake rotor on two lateral sides thereof simultaneously, whereby to provide a braking effect to stop the rotation of the wheel axles of the bicycle.

However, once a disc brake caliper is assembled, the angle of the tubing cannot be adjusted by pulling the tubing connector. As a result, if a brake caliper is removed from a bicycle and then installed on another one, the tubing connector and the frame of the bicycle may interfere with each other, or the connector may not be able to perfectly fit the frame. In such situations, the brake caliper is actually not installed properly at the right position. If the tubing gets loose because of this, and therefore loses the brake function while the bicycle is being used, it may lead to very dangerous consequences.

To overcome the aforementioned problems, some manufacturers in the industry have developed various types of disc brake calipers, of which the angle of the tubing can be adjusted. The brake caliper disclosed in the Taiwan utility model patent publication No. 201518161 and the floating direction-changing structure for connectors disclosed in Taiwanese Patent No. M434727 are two examples. The disclosures in said patents both use a bolt to fix or to release the tubing connector, whereby the connector is restricted from being moved when fixed, and is allowed to adjust the angle thereof when released. However, such design can only allow the tubing to be adjusted in one single rotating direction, which fails to solve the aforementioned problems in an effective way. In all aspects, conventional disc brake calipers still have room for improvements.

BRIEF SUMMARY OF THE INVENTION

In view of the above, the primary objective of the present invention is to provide a disc brake caliper of a bicycle, wherein a tubing of the disc brake caliper could be adjusted in multiple directions as required.

To achieve the objective of the present invention, the present invention provides a disc brake caliper, which includes a main body, a first bolt, an intermediate member, a second bolt, and a tubing connector. The main body has a rotor passage adapted to be inserted by a disc brake rotor, wherein a piston cylinder is provided in the rotor passage on at least one side thereof. A piston is provided in the piston cylinder, and is movable toward the rotor passage. An oil passage is provided in the main body, and communicates with the piston cylinder. The main body has a first tapped hole communicating with the oil passage. The first bolt is screwed in the first tapped hole, wherein a first exposed section of the first bolt is exposed out of the main body, and has a first inflow bore provided thereon. A first outflow bore is provided on another section of the first bolt which is in the main body, and communicates with the first inflow bore. The intermediate member has a first perforation going through the intermediate member, and a second tapped hole communicating with the first perforation, wherein a central axis of the second tapped hole and a central axis of the first perforation extend in different directions. The intermediate member fits around the first exposed section through the first perforation, and is able to be rotated relative to the first exposed section. The second bolt is screwed in the second tapped hole, wherein a second exposed section of the second bolt is exposed out of the intermediate member, and has a second inflow bore provided thereon. A second outflow bore is provided on another section of the second bolt which is in the intermediate member, and communicates with the second inflow bore. The tubing connector has a second perforation going therethrough, wherein the tubing connector fits around the second exposed section through the second perforation, and is able to be rotated relative to the second exposed section. A rotation direction of the tubing connector is different from a rotation direction of the intermediate member. The tubing connector has a connecting tube which is adapted to connect a tubing. The connecting tube has a third inflow bore provided thereon. A third outflow bore is provided on an inner wall of the second perforation of the tubing connector, and communicates with the third inflow bore. Whereby, when the second bolt is tightened, the tubing connector is pressed against the intermediate member to restrict the tubing connector from rotating, and an end of the second bolt screwed in the intermediate member abuts against the first bolt to restrict the intermediate member from rotating.

Whereby, when the second bolt is tightened, the tubing connector would be pressed against the intermediate member, and therefore would be restricted from rotating. Furthermore, the end of the second bolt screwing in the intermediate member would push against the first bolt, whereby to restrict the intermediate member from rotating as well.

With the aforementioned design, by tightening or loosening the second bolt, the tubing connector and the intermediate member could be either restricted from being rotated or allowed to be rotated. Whereby, the position of the tubing could be adjusted in multiple directions.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
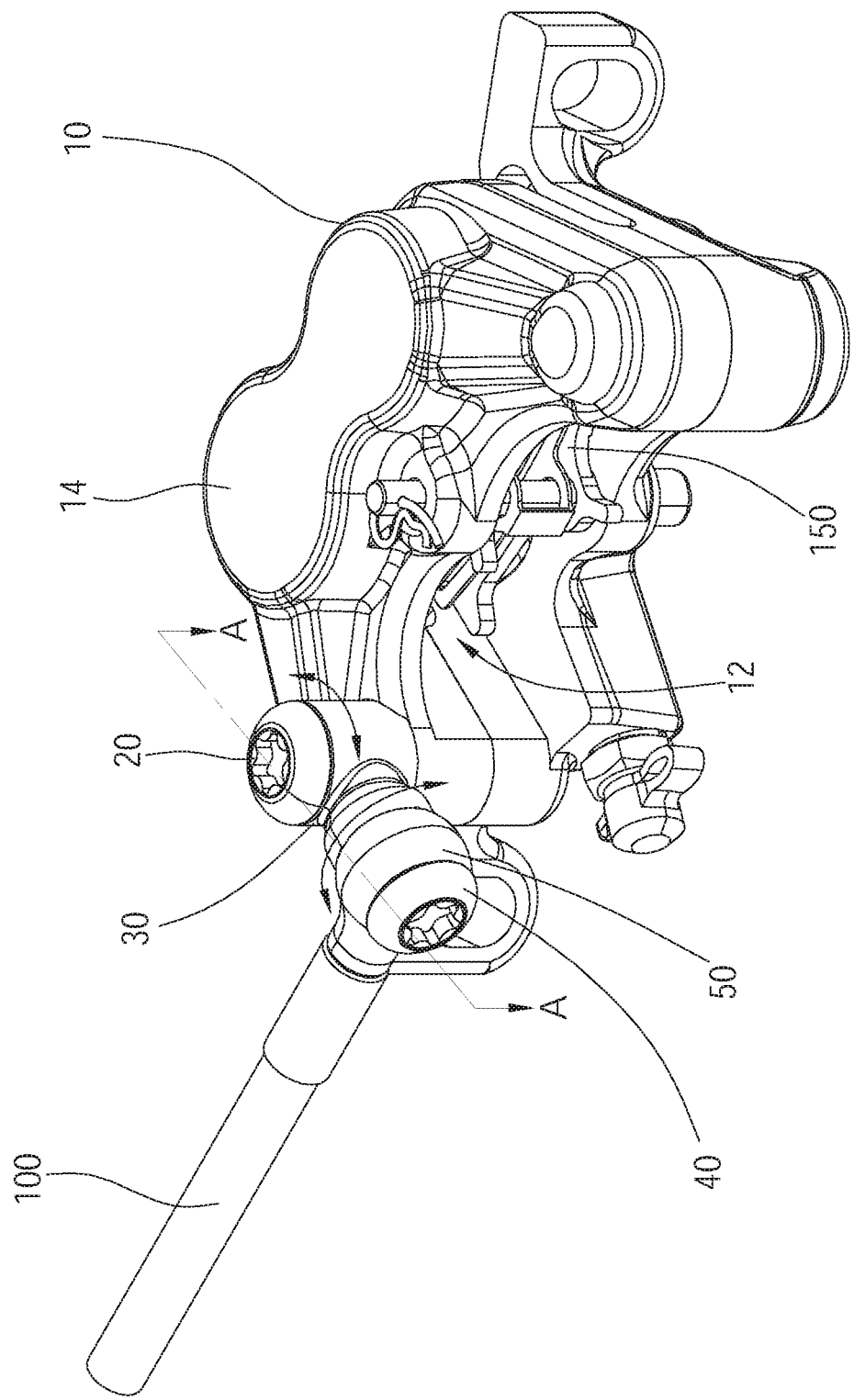
FIG. 1 is a perspective view of an embodiment of the present invention.
Figure 2:
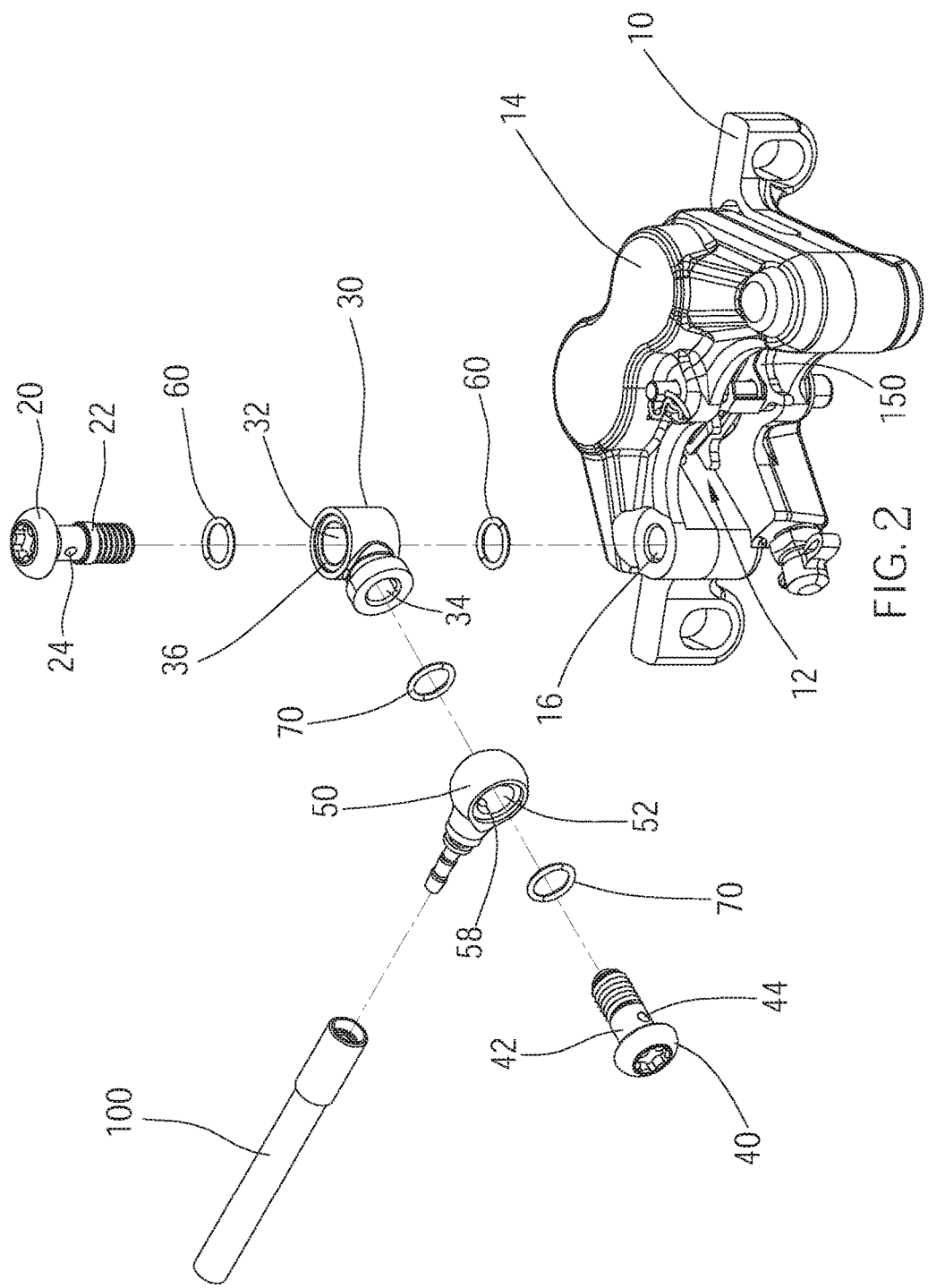
FIG. 2 is an exploded view of the embodiment of the present invention.

A disc brake caliper of an embodiment of the present invention, which is adapted to be used in bicycles, is illustrated in FIG. 1 and FIG. 2, including a main body 10, a first bolt 20, an intermediate member 30, a second bolt 40, a tubing connector 50, and four O-rings 60, 70.

The main body 10 has a rotor passage 12 adapted to be inserted by a disc brake rotor (not shown). Each of two lateral sides of the rotor passage 12 is adapted to have a brake pad 150 provided therein. A piston cylinder 14 is respectively provided in the main body 10 on each of two lateral sides of the rotor passage 12. Each of the piston cylinders 14 has a piston (not shown) provided therein, which could push the corresponding brake pad 150 to move toward the disc brake rotor. Furthermore, an oil passage (not shown) is provided in the main body 10 to communicate the piston cylinders 14. The main body 10 has a first tapped hole 16 communicating with the oil passage.

Figure 3:
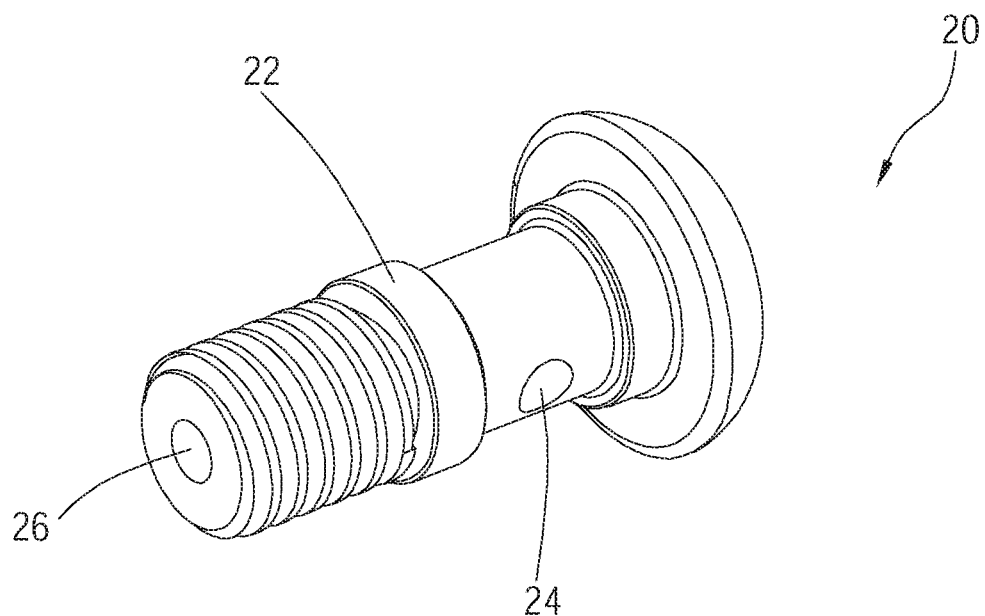
FIG. 3 is a perspective view of the first bolt of the embodiment of the present invention.

The first bolt 20 is screwed in the first tapped hole 16 as shown in FIG. 3, with a section thereof exposed out of the main body 10. Said exposed section of the first bolt 20 is defined as a first exposed section 22, wherein a circular recess is recessed into a surface of the first exposed section 22. A first inflow bore 24 is provided on a bottom of the circular recess. In addition, a first outflow bore 26 is provided on an end surface of the first bolt 20 which is screwed into the main body 10. The first outflow bore 26 communicates with the first inflow bore 24.

Figure 6:
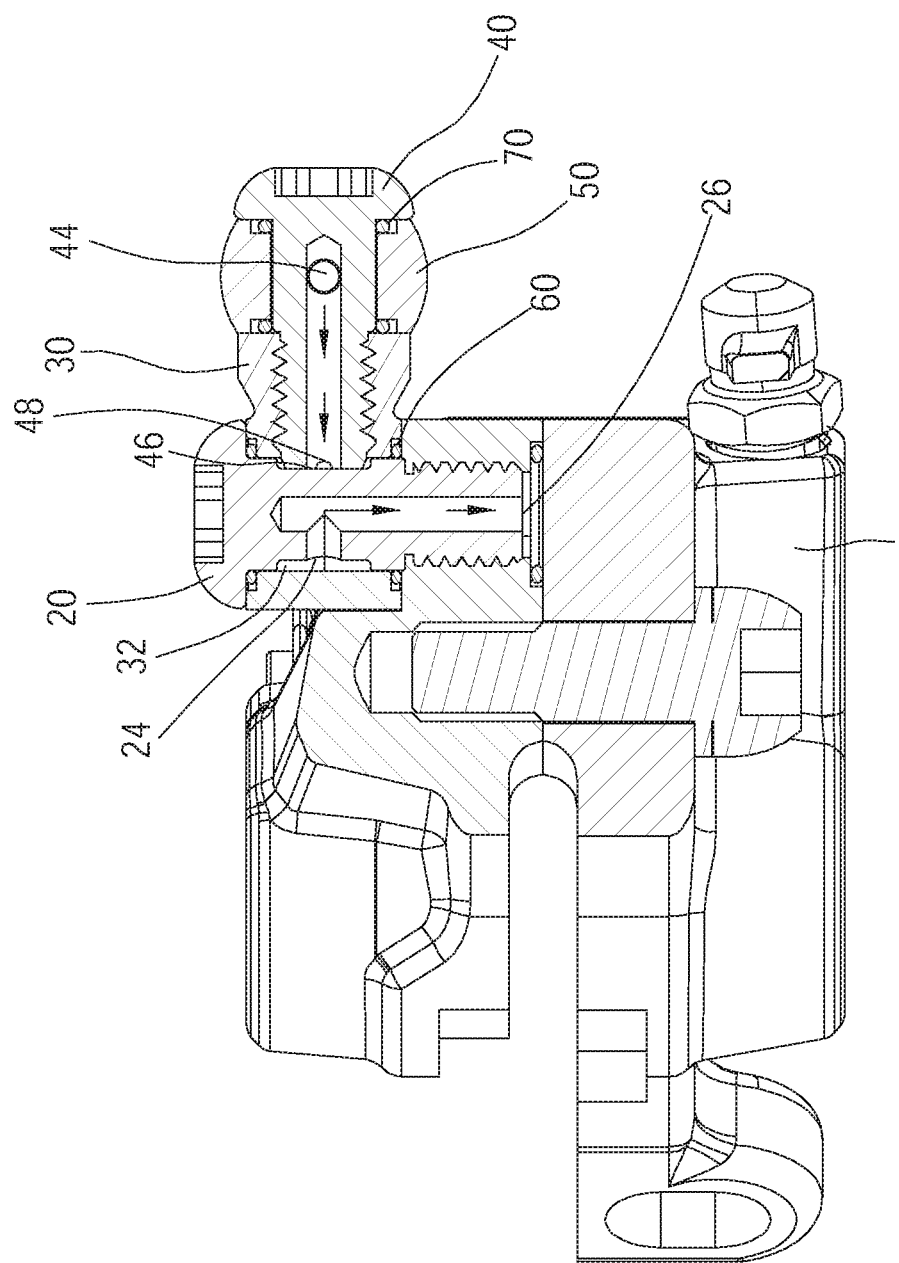
FIG. 6 is a sectional view along the A-A line in FIG. 1.

The intermediate member 30 has a first perforation 32 going through the intermediate member 30, and a second tapped hole 34 communicating with the first perforation 32, wherein a central axis of the second tapped hole 34 and a central axis of the first perforation 32 extend in different directions. In the embodiment, the central axis of the second tapped hole 34 is perpendicular to the central axis of the first perforation 32. However, this is not a limitation of the present invention. In other embodiments, the angle between the central axis of the second tapped hole 34 and the central axis of the first perforation 32 could be other a right angle to meet different requirements. In addition, the intermediate member 30 has two grooves 36, each of which is respectively provided at each end of the first perforation 32. The intermediate member 30 fits around the first exposed section 22 through the first perforation 32, wherein the intermediate member 30 could be rotated relative to the first exposed section 22. Furthermore, two of the O-rings (i.e., the O-rings 60) fit around the first exposed section 22, and are respectively received in the grooves 36 of the intermediate member 30. In other words, said O-rings 60 are located between the first bolt 20 and the intermediate member 30, as illustrated in FIG. 6.

Figure 4:
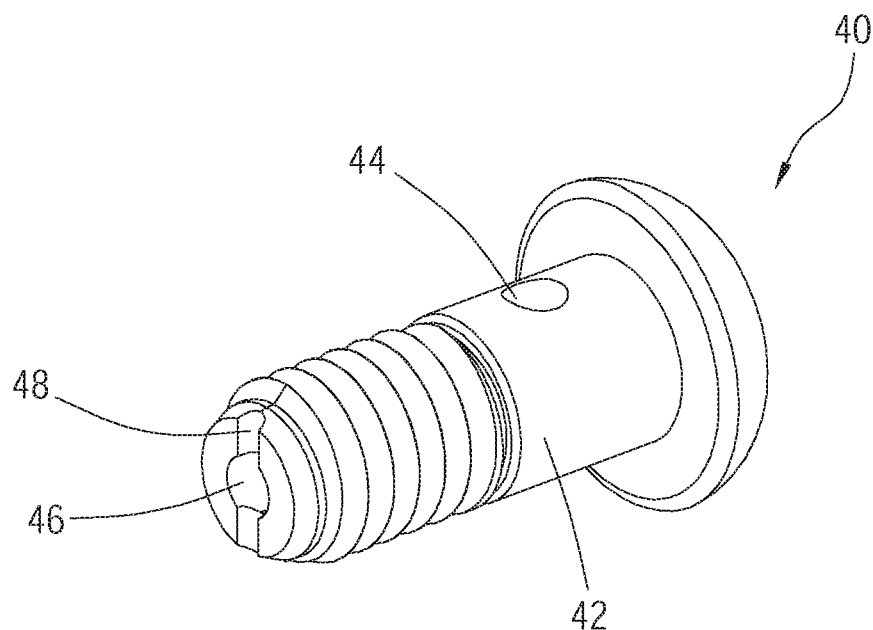
FIG. 4 is a perspective view of the second bolt of the embodiment of the present invention.

The second bolt 40 is screwed in the second tapped hole 34, as shown in FIG. 4, with a section thereof exposed out of the intermediate member 30. Said exposed section is defined as a second exposed section 42. A second inflow bore 44 is provided on the second exposed section 42. In addition, a second outflow bore 46 is provided on an end surface of the second bolt 40 which is screwed into the intermediate member 30, wherein the second outflow bore 46 communicates with the second inflow bore 44. Furthermore, a channel 48 is provided on the end surface, and communicates with the second outflow bore 46.

Figure 5:
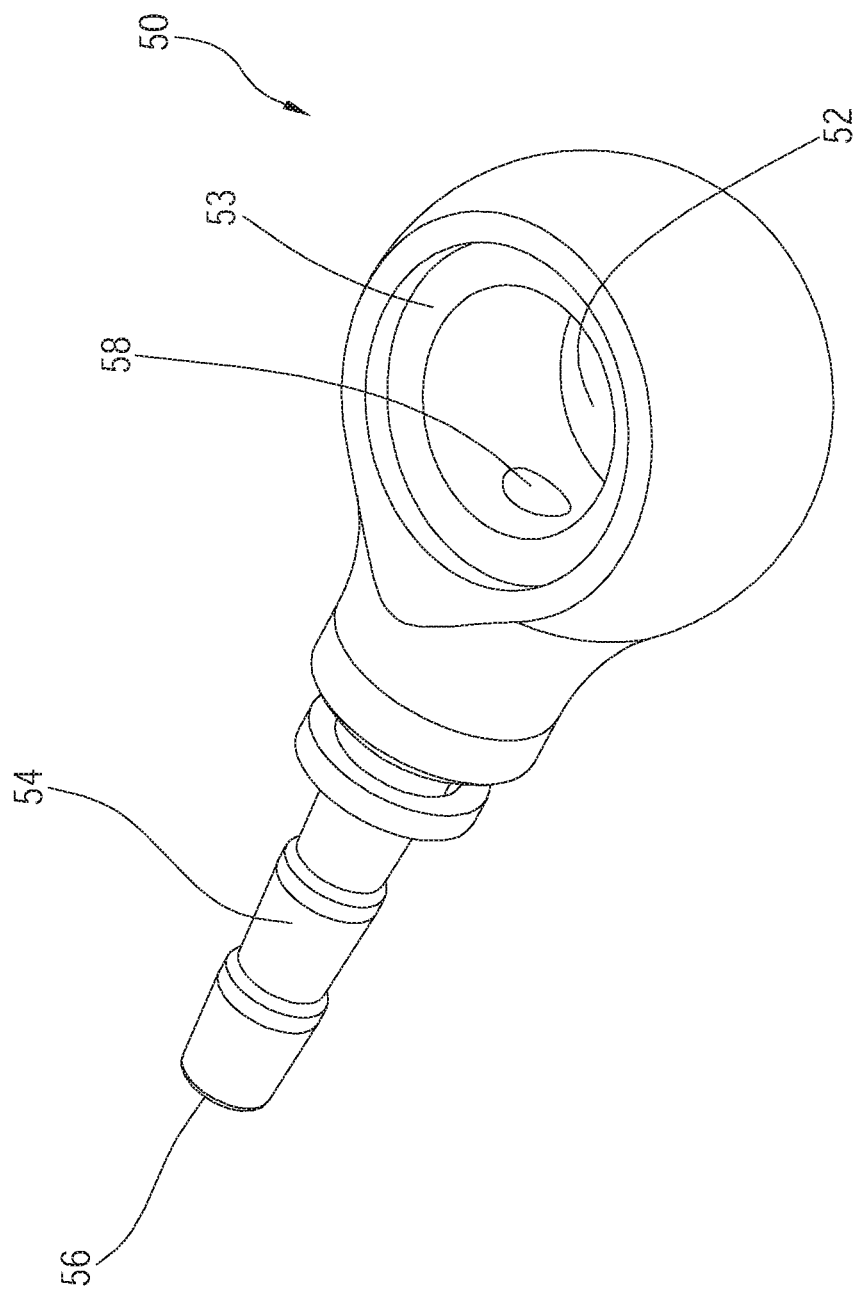
FIG. 5 is a perspective view, showing the tubing connector of the embodiment of the present invention.

As shown in FIG. 5, the tubing connector 50 has a second perforation 52 going through the tubing connector 50, and a groove 53 is provided at each of two ends of the second perforation 52 of the tubing connector. The tubing connector 50 fits around the second exposed section 42 through the second perforation 52, wherein the tubing connector 50 could be rotated relative to the second exposed section 42, and a rotation direction of the tubing connector 50 is different from a rotation direction of the intermediate member 30. In the embodiment, the central axis of the second tapped hole 34 of the intermediate member 30 is perpendicular to the central axis of the first perforation 32. In addition, two of the O-rings (i.e., the O-rings 70) fit around the second exposed section 42, and are respectively received in the grooves 53 of the tubing connector 50. In other words, said O-rings 70 are located between the second bolt 40 and the tubing connector 50, as illustrated in FIG. 6. The tubing connector 50 further has a connecting tube 54 adapted to connect a tubing 100, wherein the connecting tube 54 has a third inflow bore 56 provided thereon. A third outflow bore 58 is provided on an inner wall of the second perforation 52 of the tubing connector 50, and communicates with the third inflow bore 56.

In this way, the tubing connector 50 and the intermediate member 30 could rotate freely when the second bolt 40 is not tightened yet. Whereby, the tubing connector 50 and the intermediate member 30 could be rotated as required to adjust the position of the tubing 100 in multiple directions, which could prevent the tubing 100 or the tubing connector 50 from interfering with a bicycle frame (not shown). Also, as a result, the arrangement of the tubing 100 could be neater.

As shown in FIG. 6, after the adjustment of the position of the tubing 100 has been completed, the second bolt 40 could be tightened to press the tubing connector 50 against the intermediate member 30, whereby the tubing connector 50 would be restricted from rotating. In addition, the end of the second bolt 40 which is screwed in the intermediate member 30 would abut against the circular recess of the first bolt 20, whereby to restrict the intermediate member 30 from rotating as well. In this way, the position of the tubing 100 is fixed. In other words, simply by tightening or loosening the second bolt 40, the tubing connector 50 and the intermediate member 30 could be either restricted from being rotated or allowed to be rotated at the same time. Whereby, the installation and the adjustment of the disc brake caliper could be more convenient.

As shown in FIG. 6, with the aforementioned design, when a brake lever (not shown) is pulled to inject brake oil into the third inflow bore 56 of the tubing connector 50 through the tubing 100, the brake oil would flow into the oil passage of the main body 10 and the piston cylinders 14 to move the piston, and to consequently make the brake pads 150 clamp the disc brake rotor on two lateral sides thereof, whereby to provide the braking effect. In more details, the brake oil would sequentially flow through the third outflow bore 58, the second perforation 52, the second inflow bore 44 of the second bolt 40, the second outflow bore 46, the first perforation 32 of the intermediate member 30, the first inflow bore 24 of the first bolt 20, and finally flow out from the first outflow bore 26.

It is worth mentioning that, the design of the grooves 36, 53 on two lateral sides of the first perforation 32 and the second perforation 52, and the O-rings 60, 70 could prevent the brake oil from leaking from the first perforation 32 or the second perforation 52, maintaining an oil pressure of the disc brake caliper of the bicycle during operation, which could enhance the safety while using the disc brake caliper of the bicycle.

In addition, the circular recess recessed into the first exposed section 22 of the first bolt 20 is designed in this way because the first perforation 32 could provide more space for receiving the brake oil while keeping the intermediate member 30 small, which could ensure the flow rate and the smoothness of the brake oil while flowing. The channel 48 on the end surface of the second bolt 40 is provided to ensure the brake oil flowing out from the second outflow bore 46 could quickly flow into the first perforation 30 through the channel 48 without being hindered when the second bolt 40 abuts against the first bolt 20. Whereby, the brake oil could flow smoothly.

With the aforementioned design, the position of the tubing 100 could be adjusted in multiple directions to preventing the tubing 100 and the tubing connector 50 from interfering with each other, whereby to provide a beautiful appearance for the bicycle, and to effectively enhance the safety. In addition, the flow rate of the brake oil could be maintained in good condition during operation, which could ensure the smooth flow of the brake oil and the safety while riding the bicycle. It must be pointed out that the embodiments described above are only some preferred embodiments of the present invention. All equivalent structures which employ the concepts disclosed in this specification and the appended claims should fall within the scope of the present invention.

What is claimed is:

1. A disc brake caliper of a bicycle, comprising:
a main body having a rotor passage adapted to be inserted by a disc brake rotor, wherein a piston cylinder is provided in the rotor passage on at least one side thereof; a piston is provided in the piston cylinder, and is movable toward the rotor passage; an oil passage is provided in the main body, and communicates with the piston cylinder; the main body has a first tapped hole communicating with the oil passage;
a first bolt screwed into the first tapped hole, wherein a first exposed section of the first bolt is exposed out of the main body, and has a first inflow bore provided thereon; a first outflow bore is provided on another section of the first bolt which is in the main body, and communicates with the first inflow bore;
an intermediate member having a first perforation going through the intermediate member, and a second tapped hole communicating with the first perforation, wherein a central axis of the second tapped hole and a central axis of the first perforation extend in different directions; the intermediate member fits around the first exposed section through the first perforation, and is able to be rotated relative to the first exposed section;
a second bolt screwed into the second tapped hole, wherein a second exposed section of the second bolt is exposed out of the intermediate member, and has a second inflow bore provided thereon; a second outflow bore is provided on another section of the second bolt which is in the intermediate member, and communicates with the second inflow bore; and
a tubing connector having a second perforation going therethrough, wherein the tubing connector fits around the second exposed section through the second perforation, and is able to be rotated relative to the second exposed section; a rotation direction of the tubing connector is different from a rotation direction of the intermediate member; the tubing connector has a connecting tube which is adapted to connect a tubing; the connecting tube has a third inflow bore provided thereon; a third outflow bore is provided on an inner wall of the second perforation of the tubing connector, and communicates with the third inflow bore;
wherein a circular recess is recessed into a surface of the first exposed section, and the first inflow bore is located in the circular recess;
wherein the second bolt abuts against the intermediate member to restrict the tubing connector from rotating relative to the intermediate member, and an end of the second bolt screwed into the intermediate member abuts against the circular recess of the first bolt to restrict the intermediate member from rotating;
wherein the second outflow bore of the second bolt is located on an end surface of the second bolt abutting against the circular recess;
wherein a channel is provided on the end surface of the second bolt, and communicates with the second outflow bore.

2. The disc brake caliper of claim 1, wherein the central axis of the second tapped hole of the intermediate member is perpendicular to the central axis of the first perforation.

3. The disc brake caliper of claim 1, wherein the rotation direction of the tubing connector is perpendicular to the rotation direction of the intermediate member.

4. The disc brake caliper of claim 1, further comprising two O-rings, wherein each of two ends of the first perforation of the intermediate member respectively has a groove; the O-rings fit around the first exposed section, and are respectively received in the grooves to be located between the first bolt and the intermediate member.

5. The disc brake caliper of claim 1, further comprising two O-rings, wherein each of two ends of the second perforation of the tubing connector 50 respectively has a groove; the O-rings fit around the second exposed section, and are respectively received in the grooves to be located between the second bolt and the tubing connector.

* * * * *